(12) United States Patent
Pizlo

(10) Patent No.: US 12,332,774 B2
(45) Date of Patent: Jun. 17, 2025

(54) ALLOCATION OF MEMORY WITHIN A DATA TYPE-SPECIFIC MEMORY HEAP

(71) Applicant: Apple Inc., Cupertino, CA (US)

(72) Inventor: Filip J. Pizlo, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 13 days.

(21) Appl. No.: 18/539,213

(22) Filed: Dec. 13, 2023

(65) Prior Publication Data

US 2024/0111669 A1 Apr. 4, 2024

Related U.S. Application Data

(62) Division of application No. 17/529,225, filed on Nov. 17, 2021, now Pat. No. 11,880,298, which is a division of application No. 16/380,380, filed on Apr. 10, 2019, now Pat. No. 11,182,283.

(60) Provisional application No. 62/736,888, filed on Sep. 26, 2018.

(51) Int. Cl.
*G06F 12/02* (2006.01)
*G06F 12/0817* (2016.01)

(52) U.S. Cl.
CPC .......... *G06F 12/023* (2013.01); *G06F 12/082* (2013.01); *G06F 12/0826* (2013.01); *G06F 2212/70* (2013.01)

(58) Field of Classification Search
CPC .. G06F 12/023; G06F 12/082; G06F 12/0826; G06F 2212/70
USPC ........................................................ 711/200
See application file for complete search history.

(56) References Cited

U.S. PATENT DOCUMENTS

| | | | |
|---|---|---|---|
| 8,725,974 B2 | 5/2014 | Dice | |
| 9,658,880 B2 | 5/2017 | Gray | |
| 10,423,527 B2* | 9/2019 | Dragoljevic | ........ G06F 12/0261 |
| 2003/0126590 A1 | 7/2003 | Burrows | |
| 2003/0177472 A1 | 9/2003 | de Jong | |
| 2008/0133891 A1 | 6/2008 | Salz | |
| 2009/0327666 A1* | 12/2009 | Wolczko | ............... G06F 9/3013 |
| | | | 712/225 |
| 2010/0287538 A1* | 11/2010 | Soundararajan | .... G06F 11/3624 |
| | | | 717/128 |
| 2011/0296135 A1 | 12/2011 | Shah | |
| 2013/0007403 A1 | 1/2013 | Malcolm | |
| 2013/0046951 A1 | 2/2013 | Jones | |
| 2013/0318132 A1* | 11/2013 | Basu | ................... G06F 12/0276 |
| | | | 707/816 |

(Continued)

OTHER PUBLICATIONS

Berger, Emery D. et al., "Composing High-Performance Memory Allocators", PLDI 2001, 11 pgs.

(Continued)

*Primary Examiner* — Than Nguyen
(74) *Attorney, Agent, or Firm* — BAKERHOSTETLER

(57) ABSTRACT

One embodiment provides for a non-transitory machine-readable medium storing instructions to cause one or more processors to perform operations comprising receiving an instruction to dynamically allocate memory for an object of a data type and dynamically allocating memory for the object from a heap instance that is specific to the data type for the object, the heap instance including a memory allocator for the data type, the memory allocator generated at compile time for the instruction based on a specification of the data type for the heap instance.

20 Claims, 16 Drawing Sheets

(56) References Cited

U.S. PATENT DOCUMENTS

| | | |
|---|---|---|
| 2014/0351550 A1* | 11/2014 | Jun .................... G06F 12/0284 |
| | | 711/173 |
| 2014/0365834 A1 | 12/2014 | Stone |
| 2015/0067293 A1* | 3/2015 | Flood ................. G06F 12/0253 |
| | | 711/170 |
| 2017/0083426 A1 | 3/2017 | Stone |
| 2017/0344475 A1* | 11/2017 | Subrahmanyam .... G06F 9/4493 |
| 2018/0032731 A1 | 2/2018 | De |
| 2018/0101683 A1* | 4/2018 | Zuckerbraun ......... G06F 9/5016 |
| 2018/0157506 A1 | 6/2018 | Ogata |
| 2018/0276120 A1 | 9/2018 | Vytiniotis |
| 2018/0349260 A1 | 12/2018 | Kurmus |
| 2019/0377694 A1 | 12/2019 | Muthukrishnan |

OTHER PUBLICATIONS

Berger, Emery D. et al., "Hoard: A Scalable Memory Allocator for Multithreaded Applications", ASPLOS 2000, Cambridge, MA, 12 pgs.

Berger, Emery D. et al., "Reconsidering Custom Memory Allocation", OOPSLA '02, Nov. 3-4, 2002, Seattle Washington, USA, 12 pgs.

Robson, J. M., "Worst case fragmentation of first fit and best fit storage allocation strategies", The Computer Journal, Dept. of Computer Studies, Univ. of Lancaster, Jan. 1975, 3 pgs.

\* cited by examiner

ALLOCATION OF MEMORY WITHIN A DATA TYPE-SPECIFIC MEMORY HEAP

CROSS-REFERENCE

This application is a Divisional of U.S. patent application Ser. No. 17/529,225, filed Nov. 17, 2021, which is a Divisional of U.S. patent application Ser. No. 16/380,380, filed Apr. 10, 2019, which claims priority to U.S. Provisional Patent Application No. 62/736,888, filed Sep. 26, 2018, each of which are incorporated herein by reference in its entirety for all purposes.

TECHNICAL FIELD

This disclosure relates generally to the field of data processing technology, and more specifically to a memory management system that provides for isolated data type-specific memory heaps.

BACKGROUND OF THE DISCLOSURE

A conventional memory heap is a block of memory from which a program can request the dynamic allocation of memory. Heap allocations are managed by the program that requests the allocation and deallocated when no longer in use. A program can dynamically request memory from a heap manager using an explicit allocation program, such as a version of malloc, or via an object constructor for object-oriented programs. The heap manager can allocate a block of a requested size from the heap and return a handle or pointer to the block. When data stored in the block is no longer needed, the requesting program can notify the memory manager that the block can be freed. The memory manager can then free the block of memory, allowing the block to be re-used for other allocations. The re-use of freed blocks can expose a system to various types of use-after-free exploits that may be used by an attacker to cause a processor to execute arbitrary program code of the attacker's choosing.

SUMMARY OF THE DESCRIPTION

Embodiments described herein provide an isolated type-specific memory heap in which objects of a single data type are stored. One embodiment provides for a non-transitory machine-readable medium storing instructions to cause one or more processors to perform operations comprising receiving an instruction to dynamically allocate memory for an object of a data type and dynamically allocating memory for the object from a heap instance that is specific to the data type for the object, the heap instance including a memory allocator for the data type, the memory allocator generated at compile time for the instruction based on a specification of the data type for the heap instance.

One embodiment provides for a non-transitory machine-readable medium storing instructions to cause one or more processors to perform operations comprising receiving an indication of a data type at a compiler, configuring an allocator to service an allocation request by program code compiled by the compiler, receiving a dynamic allocation request from the compiled program code at the compiler, and in response to the allocation request, allocating an object of the indicated data type within a memory heap that is specific to the indicated data type.

One embodiment provides for a data processing system comprising a non-transitory machine-readable medium to store instructions and one or more processors to execute the instructions. When executed, the instructions cause the one or more processors to initialize a memory heap that is specific to a data type, the memory heap including a first directory, the first directory to track a first set of memory pages, associate an allocator and a deallocator with the memory heap, the allocator and deallocator each specific to the data type associated with the memory heap. The one or more processors are further to configure the first directory with a header and a page map, the header including a bitvector to indicate status for memory pages within the first set of memory pages and the page map indicating memory addresses for the first set of memory pages, the memory pages of the first set of memory pages each associated with an index number. The one or more processors can then allocate memory within the memory heap to store an object of the data type.

One embodiment provides for a method comprising receiving an instruction to dynamically deallocate memory for an object of a data type, dynamically deallocating memory for the object in response to the instruction, the memory deallocated from a heap instance that is specific to the data type for the object, the heap instance including a memory allocator and memory deallocator that are specific to data type, and releasing physical memory for multiple deallocated objects while retaining virtual memory addresses associated with the deallocated objects.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow can be performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In the figures and description to follow, reference numbers are indicative of the figure in which the referenced element is introduced, such that an element having a reference number of N00 is first introduced in FIG. N. For example, an element having a reference number between 120 and 199 is first shown in FIG. 1, while an element having a reference number between 200 and 299 is first shown in FIG. 2, etc. Within a description of a given figure, previously introduced elements may or may not be referenced.

Figure 1:
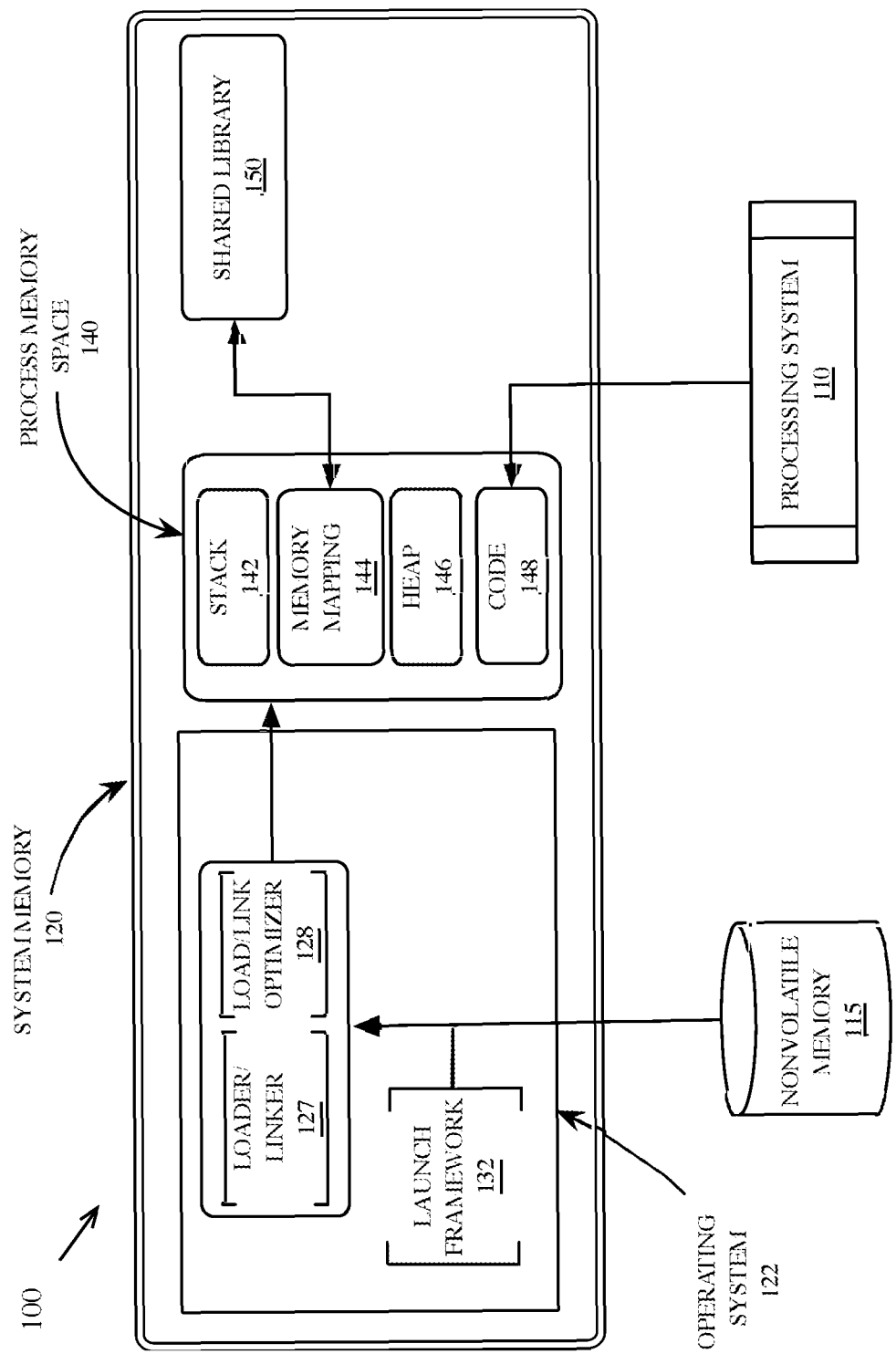
FIG. 1 is a block diagram of one embodiment of system runtime environment of a data processing system, according to an embodiment.

FIG. 1 is a block diagram of one embodiment of system runtime environment 100 of a data processing system, according to an embodiment. The data processing system contains a processing system 110 including one or more processors, which each can have one or more processor cores. The processing system 110 can direct an operating system 122 running in system memory 120 to load an application developed via an embodiment of the programming system and language for application development as described herein.

In one embodiment, the operating system 122 has an application launch framework 132, which launches applications stored in the nonvolatile memory 115 of the data processing system. In one embodiment, the operating system 122 includes a loader/linker 127 having a load/link optimizer 128 to perform additional link-time and load-time optimizations while loading components of the application into process memory space 140. An example link-time optimization is to bypass the loading of a program function if the function is not called by any other function (e.g., the linker does not resolve any symbols to the function). Should the function later become relevant, the loader/linker 127 can load the function in memory for execution. In one embodiment some modules can be stored as bitcode on nonvolatile memory 115 and a final conversion to machine code is deferred until the module is required by other components of an application. The bitcode can then be compiled by a just-in-time compiler and loaded into process memory space 140.

The process memory space 140 includes runtime components of the application, including a stack segment 142, a heap segment 146, and a code segment 148. In one embodiment the runtime environment includes a virtual memory system that allows an address space in nonvolatile memory 115 to be mapped into system memory 120. The code segment 148 of the application can be loaded via a virtual memory mapping from nonvolatile memory 115. Once loaded, the processing system 110 can execute the compiled instructions in the code segment 148.

In one embodiment, the process memory space 140 includes one or more memory mappings 144 from other areas of system memory 120, including memory spaces assigned to other applications or processes. For example, a shared library 150 provided by the system can be loaded into memory and mapped into a memory mapping 144 in the process memory space of the application that is built by an embodiment of the programming system and language for application development.

Figure 2:
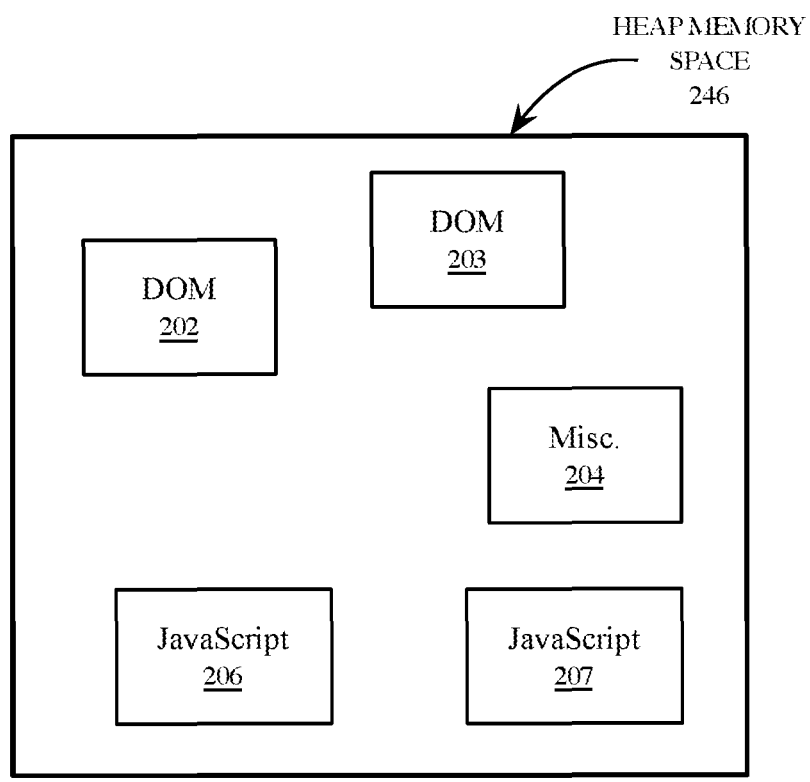
FIG. 2 illustrates a heap memory space including multiple isolated heap memories, according to an embodiment.
Figure 2:
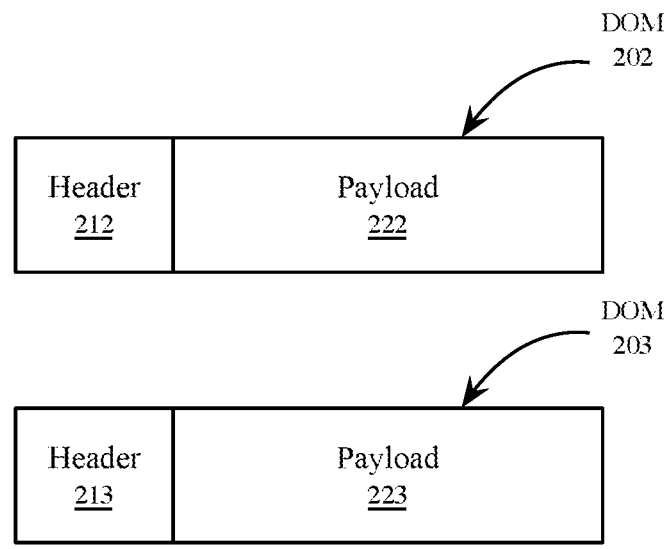

FIG. 2 illustrates a heap memory space including multiple isolated heap memories, according to an embodiment. In one embodiment a heap memory space 246 can be used in a similar manner as the heap segment 146 of FIG. 1, excepting that individual, isolated heaps are used for different types of data. The isolated heaps enhance data security by preventing exploits in which memory containing data of a certain type is prematurely freed and an object of a different type is allocated in that memory space. For example, a potential exploit may exist in some software in which an attacker can use a use-after-free exploit to generate type confusion. A use-after-free exploit refers to an attempt by an attacker to access memory after it has been freed, which can potentially enable the attacker to take control of a target system. For example, a first object can have a memory layout that includes integer data at an offset within the first object. If an attacker can cause the memory containing the integer data to be set to an attacker specified integer value, the attacker may then cause the object containing the integer to be prematurely freed. The attacker can then cause a second object of a different type to be allocated in the memory space, where the second object specifies that a pointer data type should be stored at the same memory offset that contains the attacker specified integer data. The attacker can then use the old pointer to the first object to cause integer/pointer type confusion in which the attacker specified integer data is used as a pointer. In some instances, the attacker can use such type confusion to execute arbitrary code on a victim processor.

As a countermeasure to such attacks, one embodiment provides for a heap memory space 246 in which objects of specified data types are stored in isolated, type-specific memory heaps. The heaps are spaced apart from each other in memory and only a single data type is stored in each heap, even where the data types may be similar or related. For example, objects of a first document object model (DOM) data type (DOM 202) and objects of a second DOM data type (DOM 203) are stored in separate memory heaps. Likewise, JavaScript objects of a first data type (JavaScript 206) are stored in a separate memory heap as JavaScript objects of a second data type (JavaScript 207). Other miscellaneous objects of another data type (Misc. 204) would also be stored separately.

In one embodiment, each data type-specific heap can also be configured to hoard virtual memory addresses, such that deallocation of an object will free the physical memory allocation associated with the object while retaining the allocated virtual memory address. The retained virtual memory address will not be used for objects of a different data type. If the virtual memory address is re-used for a new allocation, the address will be re-used only for allocations within the same heap (e.g., of the same data type), as an additional countermeasure against use-after-free exploits. In one embodiment, virtual memory addresses for allocated objects are used only once until and unless every virtual memory address available to the heap has been allocated.

As objects allocated within the heap memory space 246 are stored in type-specific heaps, the objects within each type-specific heap can be stored in allocations of equal size. The payload can be divided into equal size slots that can be assigned to each allocated object. Allocated objects can be stored within a payload and a header can be included to indicate a state of allocated and free memory slots within the heap. The header, in one embodiment, stores a bitfield that can indicate an allocated state for each slot within the payload. For example, a type-specific heap for a first data type (DOM 202) can include a header 212 and a payload 222 having characteristics described above. A type-specific heap for a second DOM data type (DOM 203) can also have a header 213 and payload 223, where allocated objects are stored in the payload 223 and the header 213 includes an object map to the allocated objects. The type-specific heap for each data type in the heap memory space 246 can be configured in a similar manner as illustrated for DOM 202 and DOM 203. While the layouts can be similar, the slots associated with each object can differ between heaps. Payload 222 can differ in layout to payload 223, as the sizes for DOM 202 and DOM 203 objects can differ. Accordingly, the object map in header 212 can be configured differently relative to the allocation map in header 213, as the number of object slots within payload 222 can differ from the number of object slots in payload 223.

The illustrated headers 212, 213 and payloads 222, 223 can be included in each contiguous block of memory within type-specific heaps. In one embodiment, a type-specific heap includes one or more memory pages, where each memory page includes a header and payload. In one embodiment, 16 kilobyte pages are used, although the size of each memory page can vary across embodiments and system configurations. In one embodiment, memory pages of multiple different sizes can be used, with different type-specific heaps using memory pages of different sizes. In such embodiment, one of multiple different sizes of memory pages can be selected based on the size of the objects to be stored in a type-specific heap. In one embodiment, the size and alignment requirement for objects to be allocated within isolated, type-specific heaps is specified at compile time, allowing for compile time determination of the number of objects that can be stored in each page of a type-specific heap. Based on a size and alignment requirement specified for a data type, allocation and deallocation algorithm optimizations can be performed at compile time for allocators and deallocators for the heap. Additionally, compile-time optimizations for the organizing data structure of the heap can be performed based on the size of the data type associated with an isolated heap.

In one embodiment the isolated type-specific heaps described herein are implemented in a web engine, such as the WebKit web browser engine. However, the techniques described herein are not limited to such implementation and are not limited to use with data types associated with web browser engines. Embodiments described herein can provide isolated type-specific heap implementations for any application or framework that enables dynamic memory allocation. Isolated type-specific heaps are also not limited to user space and some or all techniques described herein can be implemented at the system or kernel level. Furthermore, isolated type-specific heaps can be implemented for primitive, compound, and composite data types. In one embodiment, the use of an isolated type-specific heap for a data type is at the discretion of an application developer, which can opt-in to the use of the isolated type-specific heap, although some implementations may automatically implement isolated type-specific heaps for some types of highly sensitive data.

Figure 3A:
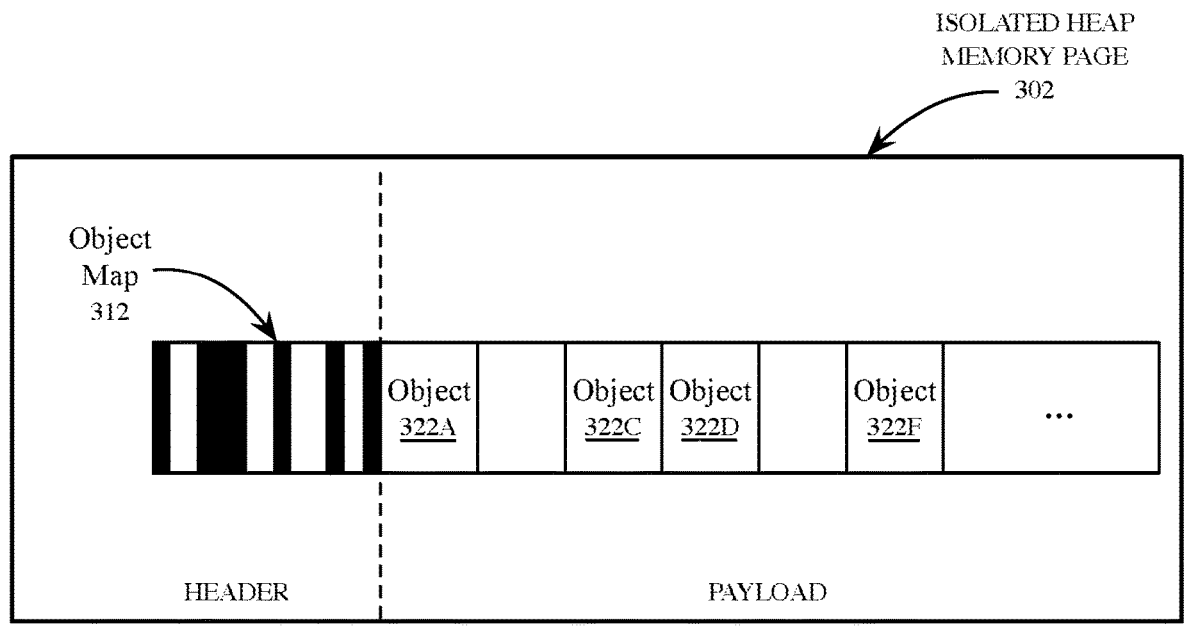
FIG. 3A illustrates an isolated heap memory page, according to an embodiment.

FIG. 3A illustrates an isolated heap memory page 302, according to an embodiment. In one embodiment an isolated heap includes multiple memory pages, where each page can include a header and payload section. The header of the heap memory page 302 can include an object map 312. The object map 312, in one embodiment, is a bitfield containing one bit for each object slot within the payload section of the isolated heap memory page. For example, multiple objects 322A-322F can be associated with various slots within the payload. For each slot within the payload, a bit can be set within the object map 312 to indicate whether the slot includes an allocated object. Each bit that is not set within the object map 312 is associated with an empty slot within a payload. The number of bits in the object map 312 can vary based on the number of object slots in the payload, with the specifics of the object map 312 and payload slots determined at compile time based on the data type associated with the heap.

Figure 3B:
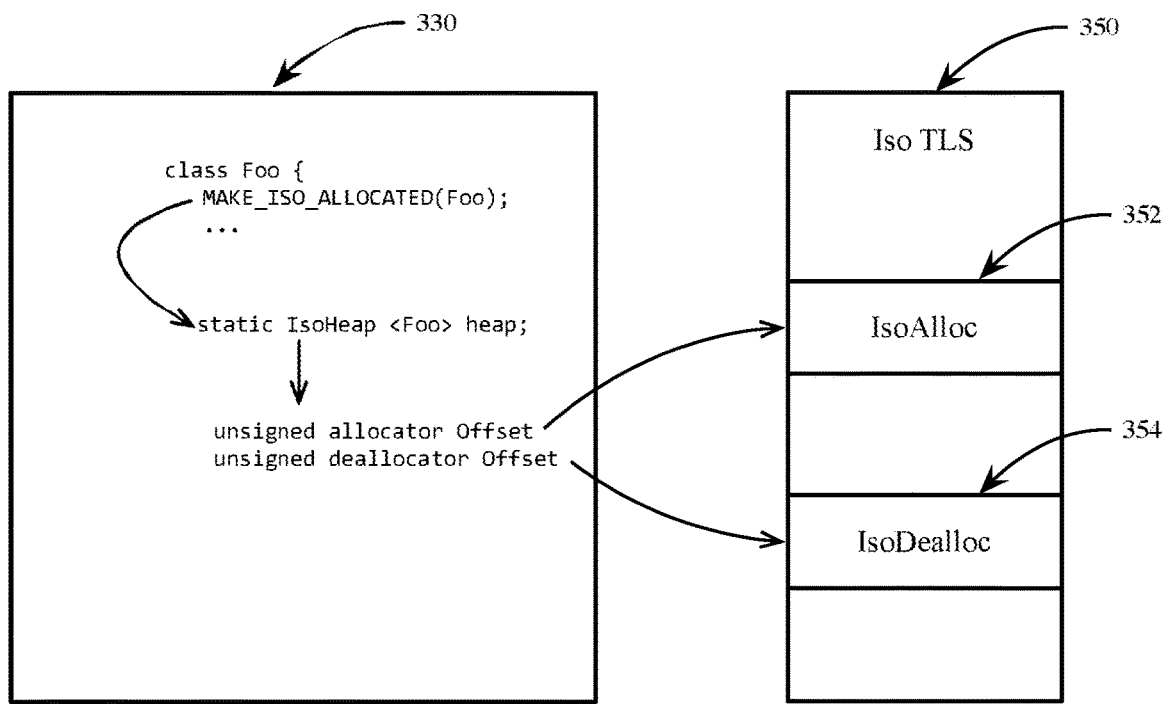
FIG. 3B illustrates a programmatic and logical implementation of aspects of an isolated type-specific memory heap, according to an embodiment.

FIG. 3B illustrates a programmatic and logical implementation of aspects of an isolated type-specific memory heap, according to an embodiment. In one embodiment a programmatic implementation 330 of a type-specific heap can be instantiated via the use of a macro (MAKE_ISO_ALLOCATED) that accepts an object data type (Foo) as input. During compilation, the macro can be expanded into an override for the new and delete operators for the object that calls the allocator and deallocator associated with the isolated heap. In one embodiment, a structure (e.g., static IsoHeap <Foo> heap) can be allocated in global storage that includes the allocator and deallocator for the isolated heap. The allocator and deallocator, in one embodiment, are template programs that are generated based on the data type specified for the isolated heap. The heap structure can include pointers to offsets within thread local storage 350 associated with each thread of a process that makes use of the isolated type-specific memory heap, where the pointers point to an allocator (IsoAlloc 352) and deallocator (IsoDealloc 354) that are generated at compile time for the isolated heap. Each process can have multiple threads, with each thread having thread local storage 350. If a thread required access to data structures that other threads are also accessing and modifying, synchronization will need to be performed between those threads, which can cause a performance reduction due to synchronization overhead. In embodiments described herein, each thread has thread local storage 350 that includes the information required to perform allocation or deallocation within the type-specific heaps described herein, providing an allocation and deallocation fast-path for the threads of a process that makes use of isolated type-specific heaps.

Figure 4:
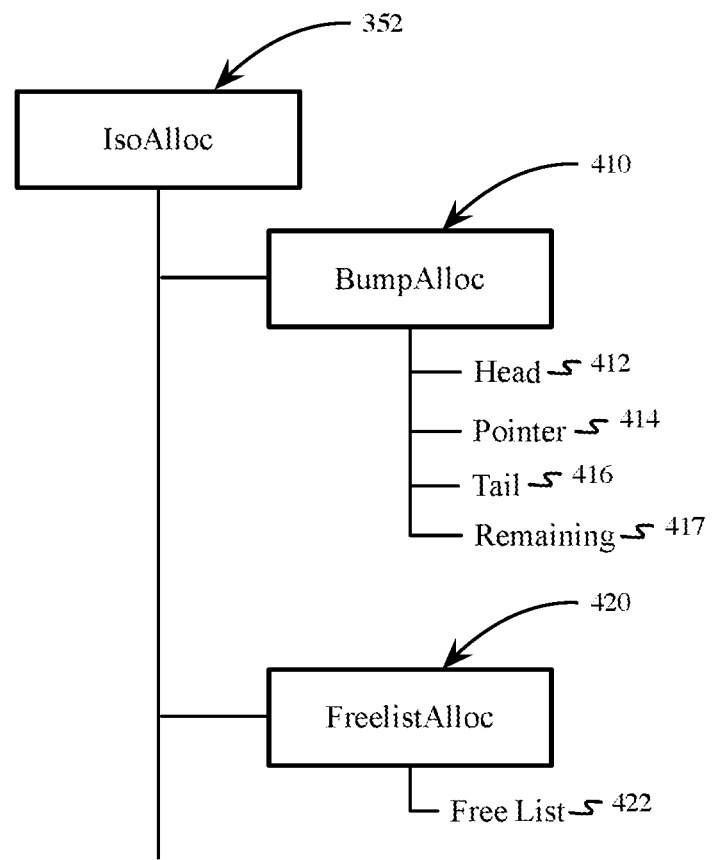
FIG. 4 illustrates elements of an allocator and deallocator for an isolated heap, according to an embodiment.
Figure 4:
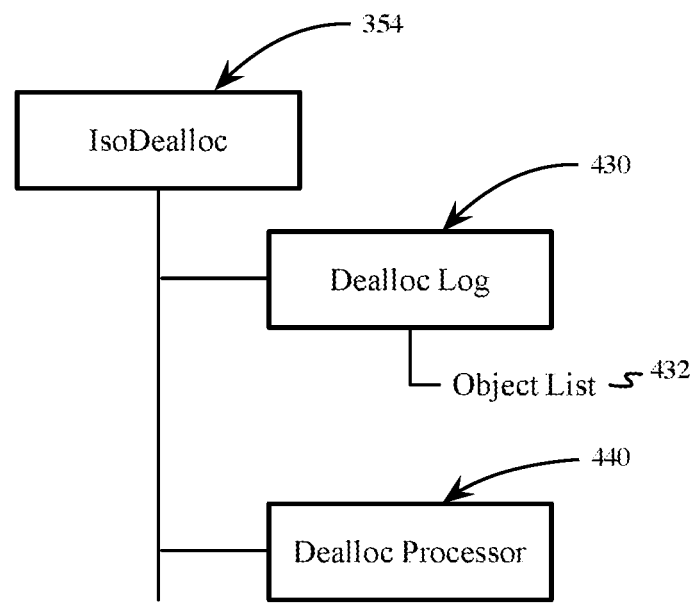

FIG. 4 illustrates elements of an allocator and deallocator for an isolated heap, according to an embodiment. In one embodiment, an isolated heap allocator (IsoAlloc 352) includes a bump allocator 410 and a free list allocator 420. An isolated heap deallocator (IsoDealloc 354), in one embodiment, includes a deallocation log 430 and a deallocation processor 440. When an object is allocated via either the bump allocator 410 or free list allocator 420, the object map (e.g., object map 312 of FIG. 3A) associated with the allocated slot is updated to indicate that an object slot has been associated with the allocated object. When the object is deallocated, the object map can be updated to indicate that the memory slot associated with the object is free.

In one embodiment the bump allocator 410 includes a head 412 and tail 416 offset for a current region of memory, a pointer 414 that points to the next free slot within the region of memory, and a remaining 417 value that indicate the amount of memory left in the bump allocation region. In various embodiments, the tail 416 offset or the remaining 417 value can be omitted, or the remaining value can be dynamically computed based on a difference between the pointer 414 and the tail 416 offset. The region of memory in which the bump allocator operates can include the entire memory heap, although in one embodiment the bump allocator can be restricted to operation within a subset of the memory heap.

The bump allocator 410 represents a fast-path for memory allocation. The free list allocator 420 can be used as a fallback path when bump allocation cannot be used for a given region of memory. For example, when the bump allocator 410 reaches the end of a bump allocation region, the bump allocator 410 may attempt to fall back to the free list allocator 420. However, when the bump allocator 410 is in use, the free list 422 of the free list allocator 420 may be NULL. Upon determination that the free list 422 is NULL, the isolated heap allocator can attempt to find an existing page from which allocations can be serviced. If an existing page is available, the object map of the page is scanned to generate a list of free memory slots within the page. That list of free memory slots can then be used to generate the free list 422 for the free list allocator 420.

The isolated heap deallocator (IsoDealloc 354), during operation, can add deallocated objects to an object list 432 within the deallocation log 430. As objects are deallocated the isolated heap deallocator can add those objects to the deallocation log instead of immediately marking the objects as free. Once the deallocation log 430 becomes full, the isolated heap deallocator can activate the deallocation processor 440, which will walk the object list 432 to free the deallocated objects within the deallocation log 430.

In one embodiment, an isolated heap can be implemented to allow only one outstanding lock per heap. The isolated heap allocator can take the lock on the heap when reconfiguring the bump allocator 410 or free list allocator 420. In one embodiment, operating the bump allocator 410 does not require acquiring the lock on the heap. The isolated heap deallocator processor 440 can take the lock to free the objects in the deallocation log 430 once the log is full, rather than locking the heap to perform individual deallocations.

Figure 5:
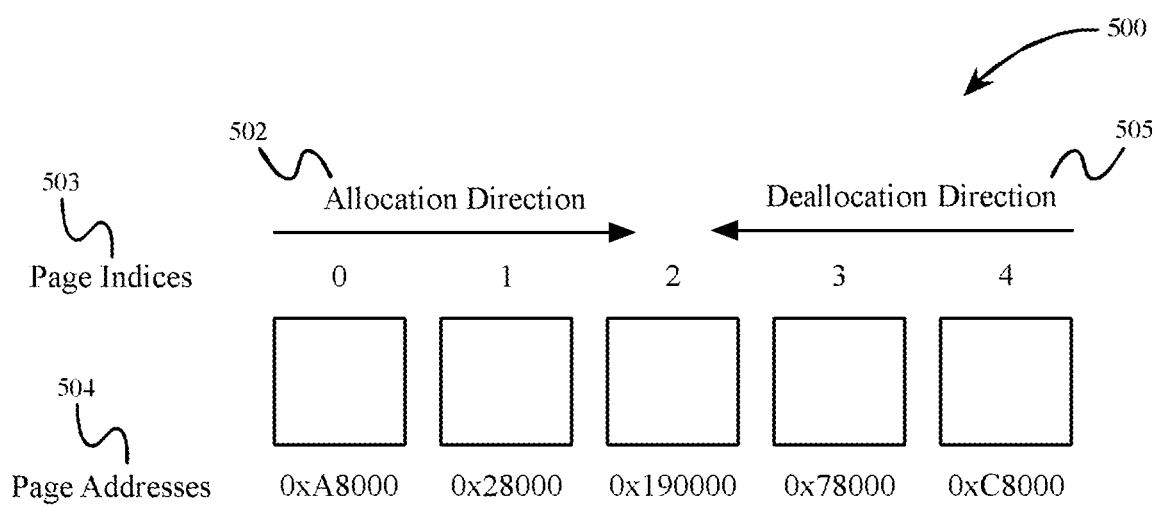
FIG. 5 illustrates an allocation and deallocation system for memory pages, according to an embodiment.

FIG. 5 illustrates an allocation and deallocation system 500 for memory pages, according to an embodiment. The allocation and deallocation system 500 can be implemented via the allocator and deallocator for an isolated type-specific heap (e.g., IsoAlloc 352, IsoDealloc 354). In one embodiment, a type-specific isolated heap can request a new memory page once existing memory pages fill. In such embodiment, when a new page is requested, the bump allocator can be reconfigured to enable bump allocation to the new page. Where type-specific isolated heaps are implemented at the application and/or user mode level, the allocator can request a memory page from the system, for example, from a kernel memory manager. In some embodiments, some or all isolated type-specific heap techniques described herein are also implemented at the system level, such that, for example, a compatible malloc implementation can request type-specific blocks of memory from a system memory manager.

In one embodiment, the allocator can allocate pages in an in a specific allocation direction 502, while the deallocator can deallocate pages in a specific deallocation direction 505. When the allocator requests new memory pages to service object allocation, the memory pages will have associated virtual memory page addresses 504. The specific virtual memory page address may be outside of the control of the allocator. In such circumstances, the allocator can be configured to assign page indices 503 to the received memory pages. The page indices allow the allocator to allocate objects in the direction of increasing page indexes. In one embodiment the allocator is configured to attempt to perform allocations within the lowest index page that has free memory. Prioritizing allocations from pages at lower indices increases the likelihood that pages at higher indices are free, as the allocator avoids those pages if possible. When freeing pages to the operating system, the deallocator can deallocate in the deallocation direction 505, in which pages are released in order of highest index to lowest index. In one embodiment, when the deallocator deallocates a page, the deallocator can release the underlying physical memory associated with the page while retaining the virtual memory. Retaining the virtual memory can prevent a use after free attack using a retained pointer to a released object.

Figure 6:
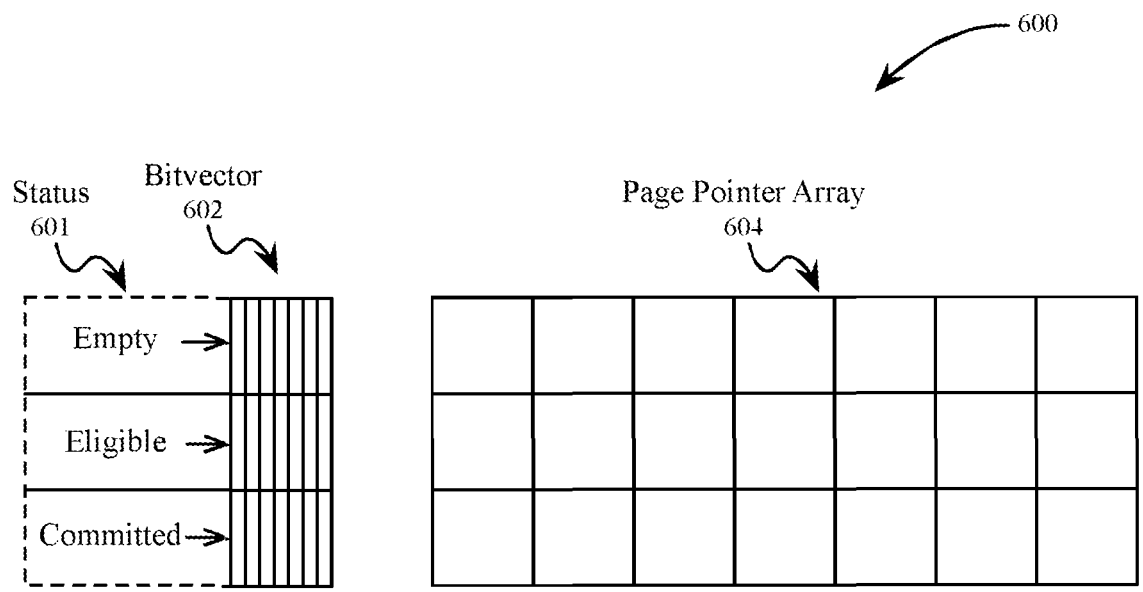
FIG. 6 illustrates a directory for an isolated type-specific heap, according to an embodiment.

FIG. 6 illustrates a directory 600 for an isolated type-specific heap, according to an embodiment. The directory 600 can be included in the data structure of an isolated type-specific heap to track the location and status of the various pages associated with the heap. In one embodiment the directory 600 can have one or more status vectors 601 that indicate a specific status for each page indexed by the directory 600. Each status vector 601 includes a bitvector 602 and a page pointer array 604. The bitvector 602 is an array of words that is divided into individual bits, where each bit that indicates whether a corresponding page in the page pointer array has the status associated with the status vector. The word size used by the bitvector 602 can vary across embodiments and implementations, and may be 8, 16, 32, or 64-bits. In some hardware 128-bit or larger word sizes may be possible. The page pointer array 604 is a page map that includes pointers to memory pages within the heap, where the memory pages each have an associated index. In one embodiment, the indices for the page pointer array 604 are associated with the page indices 503 assigned to pages received during a block request for memory pages from a system memory manager.

In one embodiment, multiple status vectors 601 are used to indicate an empty, eligible, or committed status, although different implementations can indicate different types or combinations of status. Empty pages are completely free and do not contain any allocated objects. A bit within the bitvector 602 for the empty status vector is set for each index in the associated page pointer array 604 that contains an empty page. Eligible pages contain at least one empty slot in which an object can be allocated. A bit within the eligible page bitvector is set for each index in the page pointer array that contains at least one empty slot (e.g., the page is not completely full). A committed page has an associated physical memory page. A bit within the committed page bitvector is set for each page that has a backing physical memory page. In one embodiment it is possible for pages within the heap to have virtual memory pages without backing physical memory pages. In one embodiment, when a memory page is released for other uses (e.g., released back to the operating system or to other memory manages), the physical memory for the page can be released while the virtual page can be retained. In some instances, virtual memory pages can be re-used to store objects of the same data type by committing the retained virtual page to a different physical memory page. Alternatively, virtual addresses for released pages can be retired until re-use is mandated. However, the likelihood of running out of virtual memory addresses is very low given the large amount of virtual address space available on a 64-bit capable system, even on such systems in which a 48-bit address space is in use.

In one embodiment physical memory pages may be lazily allocated, such that an allocated object may not have an associated physical memory page until physical memory is needed for the object. Thus, a page may not be empty, but also may not be committed. If a request for an object in a non-empty page is made, physical memory for the page can be allocated and the page can be marked in the committed status vector. The laziness of the physical memory allocation can be tuned based on available memory and/or performance requirements for applications that will make use of a specific instance of an isolated type-specific heap.

In one embodiment the directory 600 can be configured as a small or large directory. A small directory can contain a fixed and/or pre-allocated number of pages in the page pointer array 604 and a fixed and/or pre-allocated number of bits in the bitvector 602 for each status vector 601. For example, one instance of a small directory can point to 32 pages of memory in the page pointer array 604, where status for those pages is indicated by a 32-bit bitvector 602. In other instances, 64 pages of memory can be contained in the page pointer array 604 for each status vector 601, where status is indicated by a 64-bit bitvector 602. A large directory can contain a larger number of pages and has a larger page pointer array 604 and bitvector 602 for each status vector relative to the small directory. In one embodiment the size of a large directory can be determined at compile time based on the size of the data type associated with a given heap implementation. For example, a large directory can be configured to index 128 pages in the page pointer array 604 and can have a 128-bit bitvector 602 for each status vector 601. A series of large directories can be grouped into a container data structure, such as, for example, a linked list or another type of dynamic data structure. As new pages are added, new directories can be added to the heap data structure to manage and track status for the newly added pages.

Figure 7:
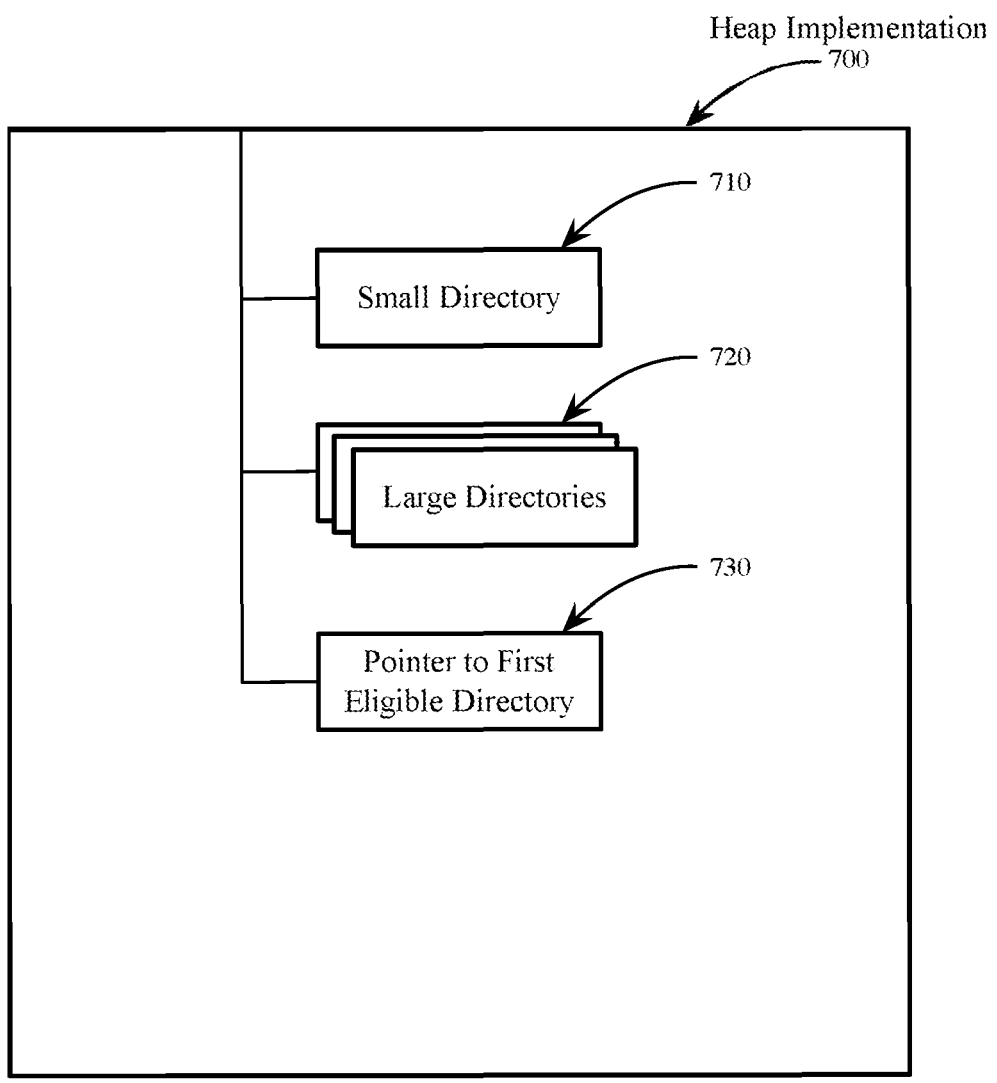
FIG. 7 illustrates an isolated type-specific heap implementation, according to an embodiment.

FIG. 7 illustrates an isolated type-specific heap implementation 700, according to an embodiment. The type-specific heap implementation 700 includes multiple directories (e.g., small directory 710, large directories 720) and a pointer to the first eligible directory 730. The specific type and configuration of directories can vary. In one embodiment, an isolated type-specific heap includes one small directory 710 and a set of large directories 720. The directories can each be large or small instances of the directory 600 of FIG. 6 and can contain multiple status vectors for the various elements of status that are tracked for a given heap implementation 700. In one embodiment, the heap implementation 700 is lazily allocated on first use and contains only the small directory 710 and the pointer to the first eligible directory 730, which can initially point to the small directory 710. When the small directory 710 fills, a large directory is created. As the heap grows, additional large directories 720 may be added. The allocation and deallocation system 500 shown in FIG. 5 is configured for first-fit allocation and favor allocation within lower-indexed memory pages. By avoiding higher-indexed memory pages where possible, the growth of an instance of a heap implementation 700 is constrained. Thus, some instances of the heap implementation 700 only a limited number of large directories may be required.

If use of large directories 720 become necessary, the fixed size of objects stored in the heap can be leveraged to enable optimizations to large directory management to maintain high performance for the heap implementation even once the number of large directories 720 begins to grow. For example, program code for the heap implementation 700 can be implemented entirely as template functions. The template functions are individualized for a specified data type at compile time. As the size of the data type is known at compile time, the template functions of the heap implementation 700 can be configured and optimized such that mathematical operations based on the size of the data object are performed on immediate values. The immediate value math operations can be performed quickly by the processor of the system and enable features such one bit-per object bitfield and one bit-per-page bitvector. The bitfields and bitvectors used by embodiments described herein would be computationally expensive to implement without the ability to use immediate math operations.

Figure 8:
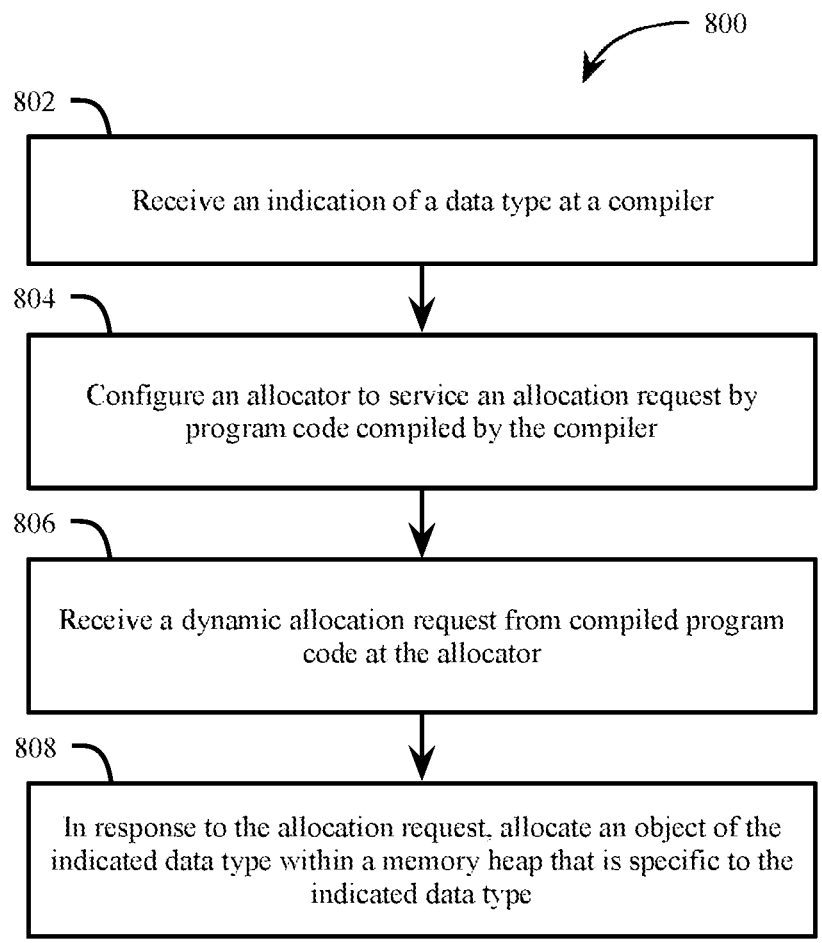
FIG. 8 is a flow diagram of a method provided via an isolated type-specific heap, according to an embodiment.

FIG. 8 is a flow diagram of a method 800 provided via an isolated type-specific heap, according to an embodiment. Method 800 can be implemented by a compiler and memory management system within a computing device or data processing system described herein. The compiler can be, for example, a just-in-time compiler that compiles program code immediately before execution of the program code on a processor. The compiled program code can be developed in a high-level language, such as Java, JavaScript, C, C++, Swift, Objective C, or a variety of other high-level languages. In one embodiment, the compiler and memory management system are provided by a web browser engine, such as the WebKit web browser engine, but embodiments are not limited to such implementation. In one embodiment, some or all aspects of the isolated type-specific heaps described herein can be implemented at the operating system level.

Method 800 includes operation 802 to receive an indication of a data type at a compiler. In one embodiment the data type is received at a macro included in program code by a developer, where the macro accepts a data type as input. The macro can be expanded at compile time into program code that implements an isolated type-specific heap for the specified data type. An indication of the data type is received in implementations in which a developer can select a specific set of data types for which isolated, type-specific heaps will be used. In one embodiment, the compiler can automatically determine the set of data types for which isolated type-specific heaps will be used. In such embodiment, the compiler can parse source code files and determine the data types for which isolated type-specific heaps will be created. The compiler can determine to use isolated type-specific heaps for all data types or for compound or complex data types. The compiler can also determine to use isolated type specific heaps for data types that contain sensitive data or may otherwise be targets for exploitation.

Method 800 additionally includes operation 804, to configure an allocator to service an allocation request by program code compiled by the compiler. To configure the allocator to service the allocation requests include to define compile time settings for the allocator, such as the allocation block size, based on the size of the data type generate code to initialize the bump allocator 410 and free list allocator 420 shown in FIG. 4, and perform compile time optimizations for the code generated for the allocator. The program code that implements the allocator and other functionality of the isolated type-specific heap can be stored in an instance of thread-local storage, for example, as shown in FIG. 3B.

Method 800 additionally includes operation 806, which is performed during execution of compiled program code. Operation 806 includes receiving a dynamic allocation request from compiled program code at the allocator that is configured during operation 804. The allocation request can be for a new object of the data type indicated during operation 802. In response to the allocation request, method 800 can perform operation 808 to allocate an object of the indicated data type within a memory heap that is specific to the indicated data type.

Figure 9A:
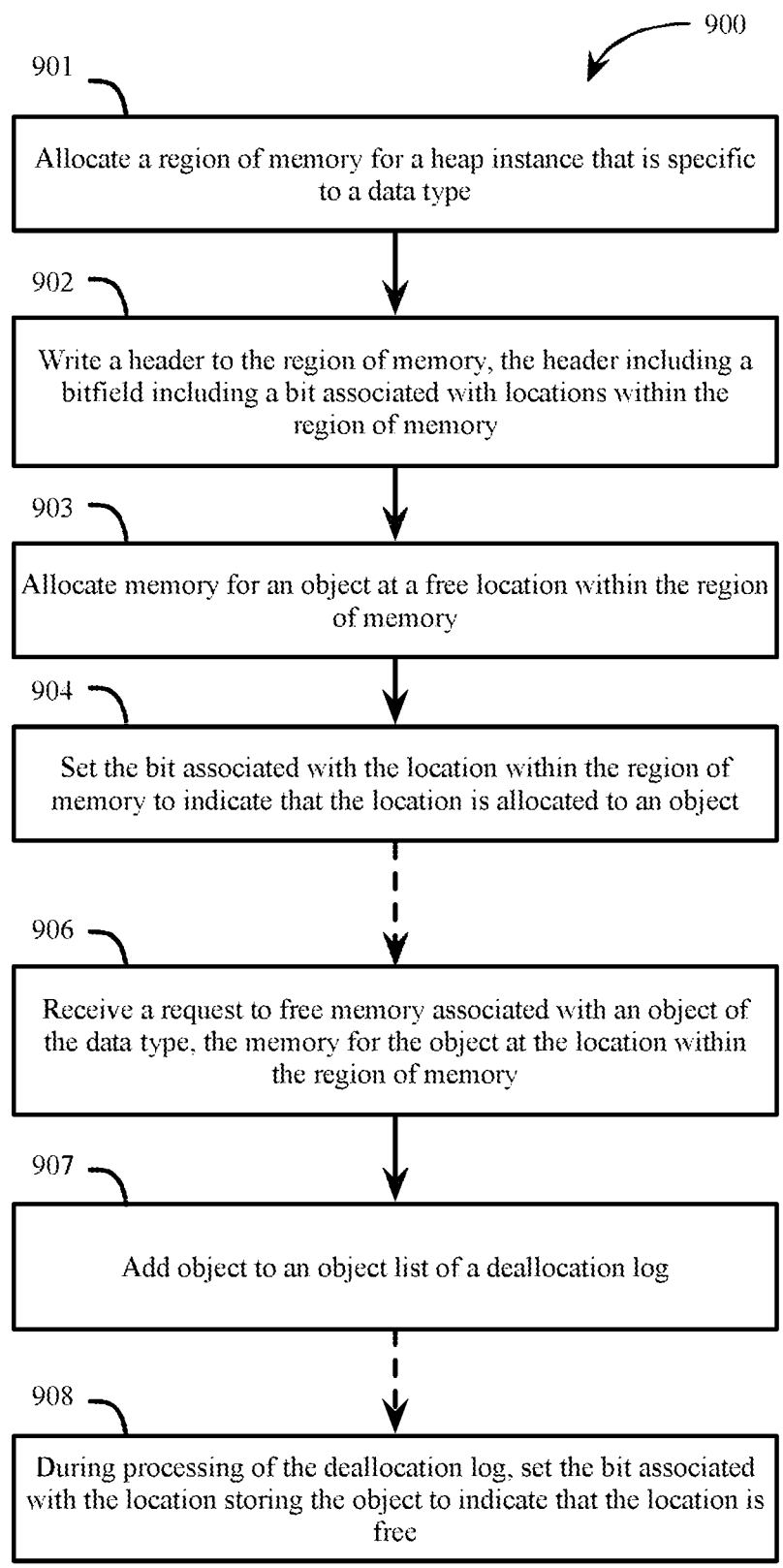
FIG. 9A is a flow diagram of a method to allocate and free and object in an isolated type-specific heap, according to an embodiment.

FIG. 9A is a flow diagram of a method 900 to allocate and free and object in an isolated type-specific heap, according to an embodiment. Method 900 can be implemented by allocator and deallocators of an isolated type-specific heap as described herein, such as IsoAlloc 352 and IsoDealloc 354 as in FIG. 3B and FIG. 4. In one embodiment, method 900 includes to perform operation 901, which allocates a region of memory for a heap instance that is specific to a data type. The region of memory can be a memory page or another block or unit of memory. The size of the allocated region of memory can vary between instances and implementations. For example, the size of the allocated region can vary based on the size of the data type associated with the heap. Method 900 additionally performs operation 902 to write a header to the region of memory. The header can include a bitfield including a bit associated with locations within the region of memory. The bits in the bitfield can indicate whether an object slot in the region is empty or is associated with an allocated object. In response to an allocation request for an object, method 900 can perform operation 903 to allocate memory for the object at a free location within the region of memory. Method 900 can then perform an operation 904 to set the bit associated with the location within the region of memory to indicate that the location is allocated to an object. In one embodiment, a bit value of one is used to indicate that a location is allocated.

After a period of time, method 900 can receive a request to free memory associated with an object at the location within the region of memory during operation 906. To indicate that an object has been freed, method 900 can set the bit associated with the location within the region of memory to indicate that the location is free. In one embodiment, the bit associated with the object is not immediately cleared. Instead, objects to be freed are added to an object list of a deallocation log, such as the object list 432 in FIG. 4. In such embodiment, method 900 will first operation 907 to add the object to be freed to the object list. Objects to be freed will be added to the free list until the object list becomes full. Once the object list becomes full, a deallocation processor (e.g., deallocation processor 440) will process the object list. Method 900 can perform operation 908 during processing to set the bit associated with the location storing the object to indicate that the object is free. In one embodiment, setting the bit includes clearing the bit or setting the value to zero. While one embodiment uses a bit value of one to indicate an allocated slot and zero to indicate an unallocated slot, embodiments are not limited to using those specific values.

Figure 9B:
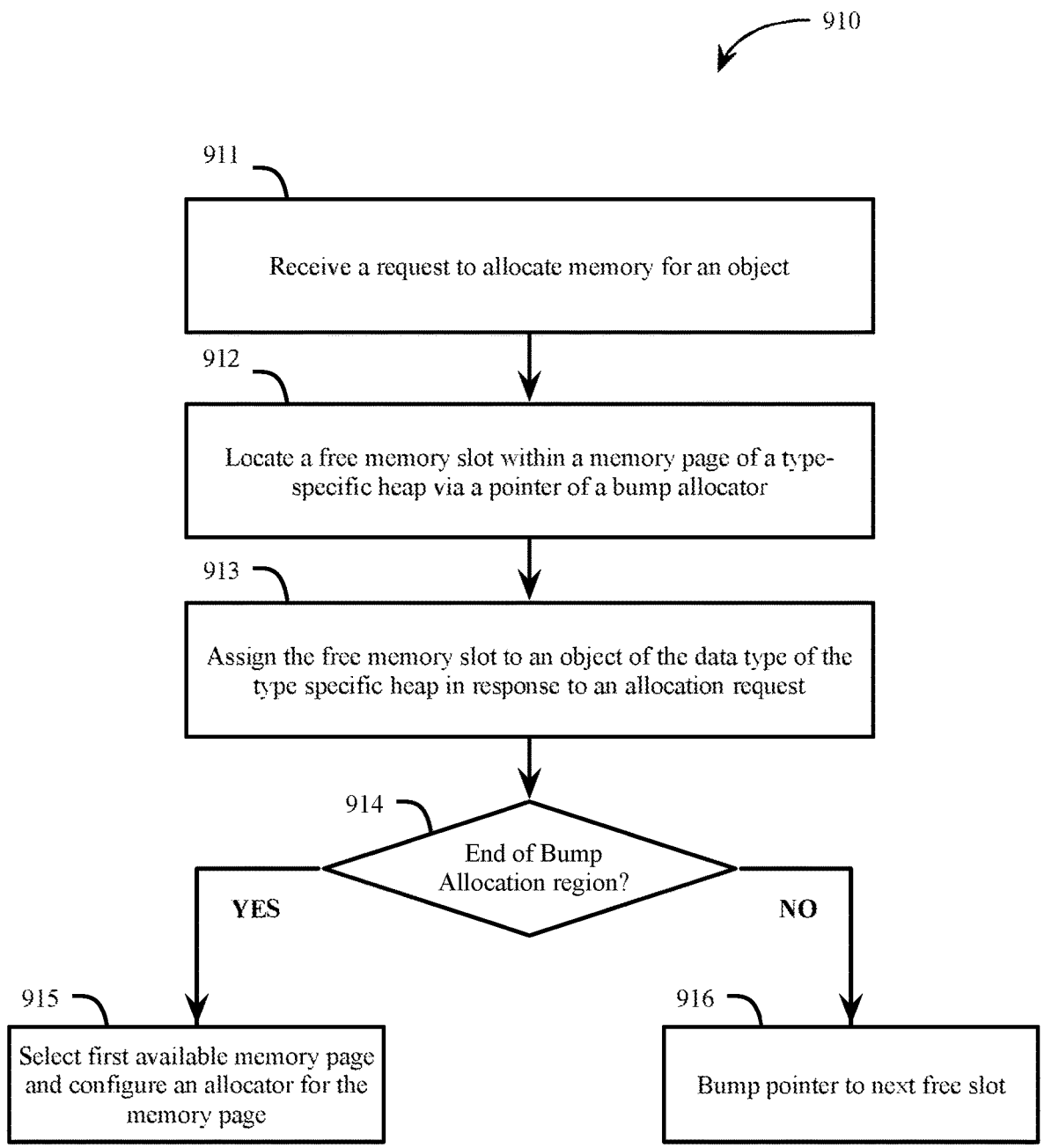
FIG. 9B is a flow diagram of a method to allocate an object within an isolated type-specific heap, according to an embodiment.

FIG. 9B is a flow diagram of a method 910 to allocate an object within an isolated type-specific heap, according to an embodiment. Method 910 can be implemented via an isolated type-specific heap allocator as described herein. In one embodiment, method 910 includes operation 911, which is performed to receive a request to allocate memory for an object. Method 910 can then proceed to operation 912, which locates a free memory slot within a memory page of a type-specific heap via a pointer of a bump allocator. Method 910 further includes operation 913, which assigns the free memory slot to an object of the data type of the type-specific heap in response to an allocation request. At operation 914, method 910 can determine if the bump allocator is at the end of the bump allocation region. The bump allocator can be determined to be at the end of the bump allocation region, in one embodiment, if the bump allocation pointer reaches a tail offset. In one embodiment, the bump allocator has reached the end of the bump allocation region when a remaining bits value becomes zero. Any other type of iterator can be used in other embodiments. If the bump allocation pointer has not reached the end of the bump allocation region, method 910 continues to operation 916, which bumps the bump allocation pointer to the next free slot.

If method 910 determines, during operation 914, that the bump allocator is at the end of the bump allocation region, the method proceeds to operation 915. During operation 915, the isolated heap memory allocator can select a first available memory page and re-configure an allocator for the memory page. The type and configuration of the allocator depends on characteristics of the selected memory page, including whether the selected memory page is full.

Figure 9C:
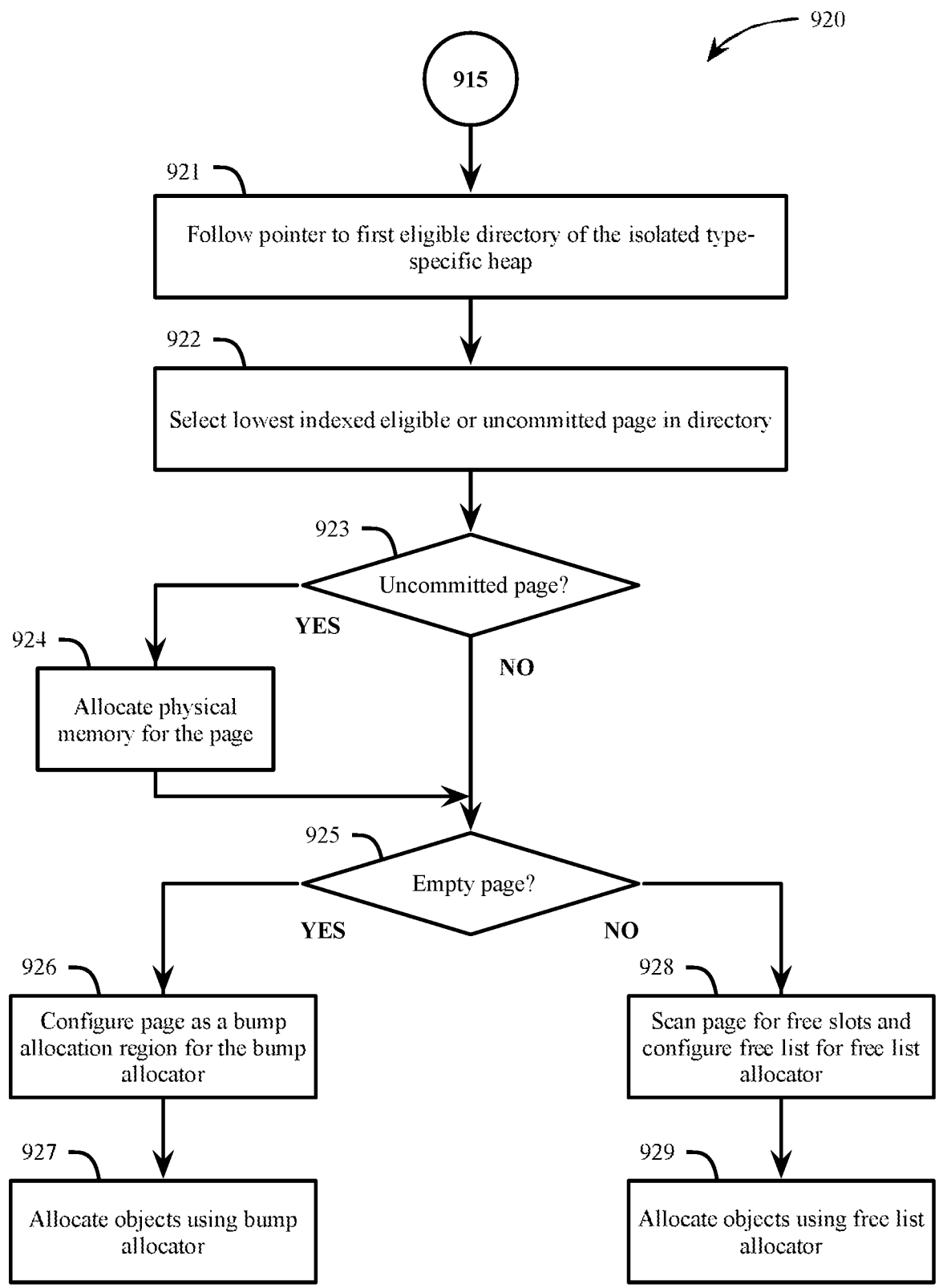
FIG. 9C is a flow diagram of a method of selecting a memory page and configuring a memory allocator for the page, according to an embodiment.

FIG. 9C is a flow diagram of a method 920 of selecting a memory page and configuring a memory allocator for the page. Method 920 can be performed by an isolated type-specific heap memory allocator as described herein. In one embodiment, method 920 includes operation 921, which follows the pointer to the first eligible directory of the isolated type-specific heap. Operation 922 can then be performed to select the lowest indexed eligible or uncommitted page in the directory, based on the bits within the eligible and committed status vectors (e.g., bitvector 602 of status vectors 601). If no pages are eligible or uncommitted, method 920 can perform an operation (not shown) to allocate a new empty page.

If an eligible or uncommitted page is available, method 920 proceeds to operation 923 to determine if the selected page is an uncommitted page. If the page is uncommitted, the method 920 can perform operation 924 to allocate physical memory for the page and then proceed to operation 925. If the page is eligible and committed, method 920 also proceeds to operation 925. At operation 925, method 920 determines whether the page is empty. If the page is empty, method 920 proceeds to operation 926 to configure the page as a bump allocation region for the bump allocator. Once the bump allocation region is configured, method 920 proceeds to operation 927, which allocates objects using the bump allocator. If the page is not empty during operation 925, method 920 proceeds to operation 928. Operation 928 includes to scan the page for free slots and configure the free list for the free list allocator based on the free slots in the page. Method 920 can then proceed to operation 929 to allocate objects using the free list allocator.

Figure 9D:
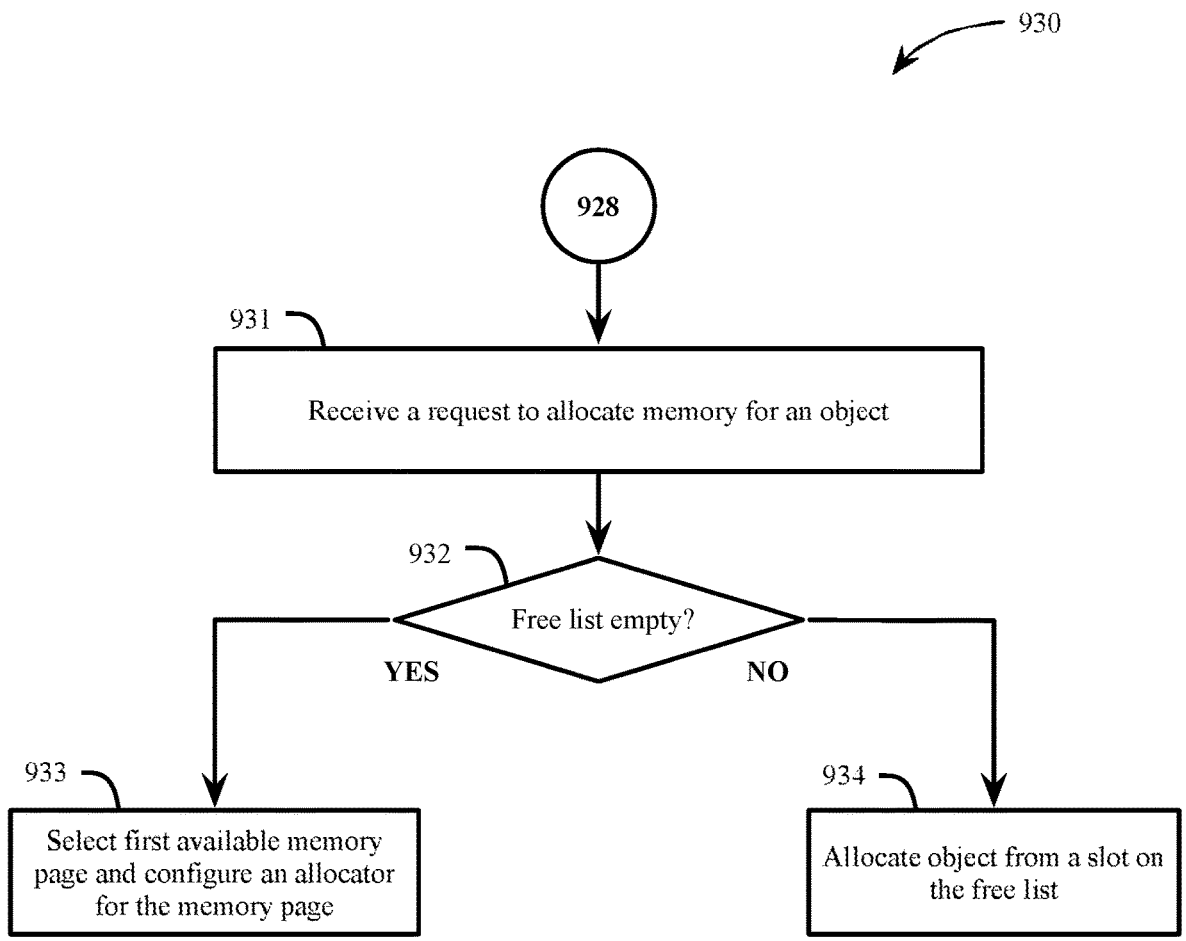
FIG. 9D is a flow diagram of a method of allocating memory using a free list allocator, according to an embodiment.

FIG. 9D is a flow diagram of a method 930 of allocating memory using a free list allocator. The method 930 includes operation 931, which receives a request to allocate memory for an object. If the free list is empty, as determined at operation 932, method 930 proceeds to operation 933, which selects the first available memory page and configure an allocator for the memory page, which is detailed by method 920 of FIG. 9C. If the free list is not empty at operation 932, method 930 proceeds to operation 934 to allocate an object from a slot on the free list.

Figure 10A:
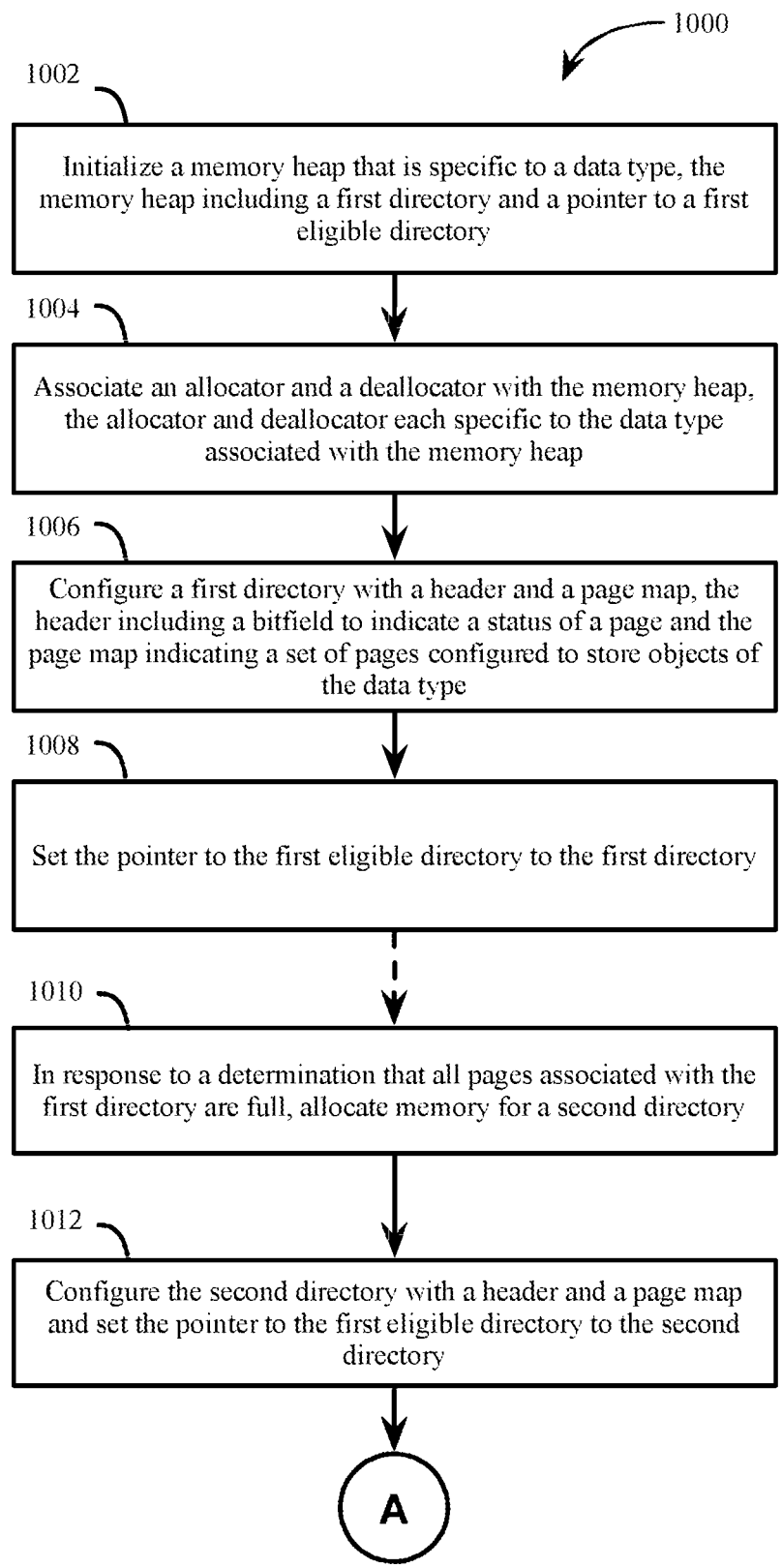
FIG. 10A is a flow diagram of a method to configure a heap implementation data structure, according to an embodiment.

FIG. 10A is a flow diagram of a method 1000 to configure a heap implementation data structure, according to an embodiment. Method 1000 can be implemented by one or more processors within a data processing system described herein based on instructions provided by application level or system level program code that is configured to executed on the data processing system.

Method 1000 includes operation 1002 to initialize a memory heap that is specific to a data type. The memory heap includes one or more directories and a pointer to a first eligible directory, for example, as illustrated for heap implementation 700 in FIG. 7. Method 1000 additionally includes operation 1004 to associate an allocator and a deallocator with the memory heap, where the allocator and deallocator are each specific to the data type associated with the memory heap. The allocator and deallocator can be stored in thread local storage as shown in FIG. 3B.

Method 1000 additionally includes operation 1006, which configures a first directory with a header and a page map. The header includes a bitvector to indicate a status of a page and the page map indicating a set of pages configured to store objects of the data type. The vector and page map can be configured as the bitvector 602 and page pointer array 604 as in FIG. 6. Multiple status vectors can be configured to map pages to multiple elements of status. Status elements include, but are not limited to empty, eligible, and committed.

Method 1000 additionally includes operation 1008 to set the pointer to the first eligible directory to the first directory, as initially the first eligible directory is the only directory. In one embodiment the first eligible directory is a small directory containing a pre-determined number of memory page slots.

After the heap implementation has been operating for a period of time, the heap may become full. Specifically, all available object slots within all available pages may be assigned to objects. Method 1000 includes operation 1010, which in response to a determination that all pages associated with the first directory are full can allocate memory for a second directory. The second directory can be used to track new memory pages that are allocated for the heap. In one embodiment the second directory is a large directory as described herein, where the large directory can manage a larger number of memory pages as a small directory. Multiple large directories can be linked via a data structure such as a linked list.

Method 1000 further includes operation 1012, which configures the second directory with a header and a page map (e.g., page pointer array) and sets the pointer to the first eligible directory to the second directory, as all available slots in the pages indexed by the first directory are full. Operations can continue in method 1020 shown in FIG. 10B.

Figure 10B:
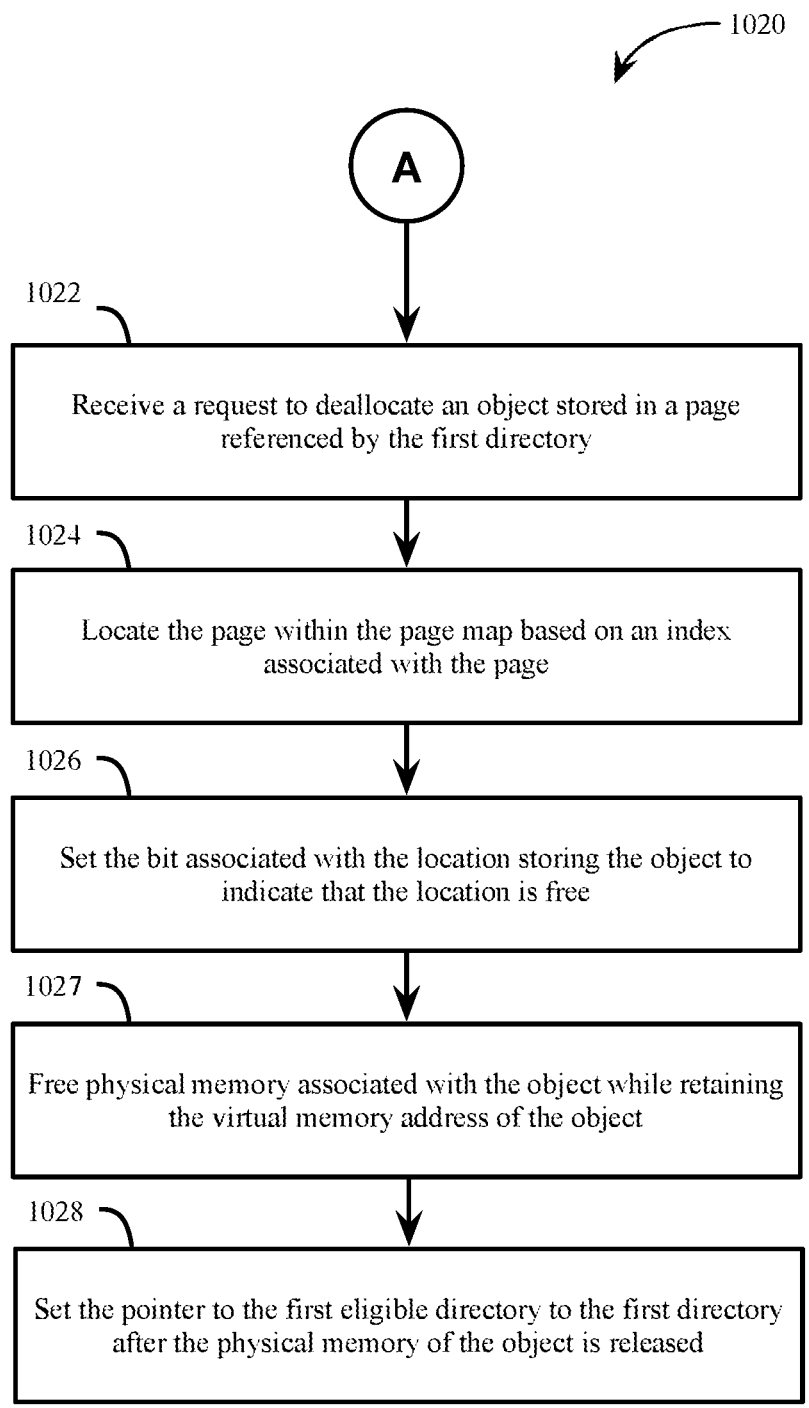
FIG. 10B illustrates a method of reconfiguring a data structure for an isolated type-specific heap, according to an embodiment.

FIG. 10B illustrates a method 1020 of reconfiguring a data structure for an isolated type-specific heap, according to an embodiment. Method 1020 can be implemented by one or more processors within a data processing system described herein in conjunction with method 1000.

Method 1020 includes operation 1022, which receives a request to deallocate an object stored in a page referenced by the first directory. In response to the request, operation 1024 can be performed to locate the page storing the object to be deallocated within the page map based on an index associated with the page. Method 1020 additionally includes operation 1026, which sets the bit associated with the location storing the object to indicate that the location is free. The bit associated with the location storing the object can be set as a batch operation in which memory for multiple objects in an object list is released by setting the allocated bit associated with those objects to indicate that the memory slot for the object is free.

Method 1020 additionally includes operation 1027, which frees physical memory associated with the object while retaining the virtual memory address of the object. In one embodiment, the physical memory associated with the object is freed during a scavenge operation in which physical memory for one or more memory pages is released back to the system and/or a larger memory pool. The scavenging operation can occur, for example, upon determination that an entire memory page is free or when there is a detection of a need to allocate more memory. In one embodiment, the scavenging operation can be performed periodically during otherwise idle periods for the heap memory manager.

After the physical memory of the object is released, potentially along with the physical memory of several other objects, method 1020 performs operation 1028 to set the pointer to the first eligible directory to the first directory, as the first directory now contains eligible pages from which object allocations can be satisfied.

Figure 11:
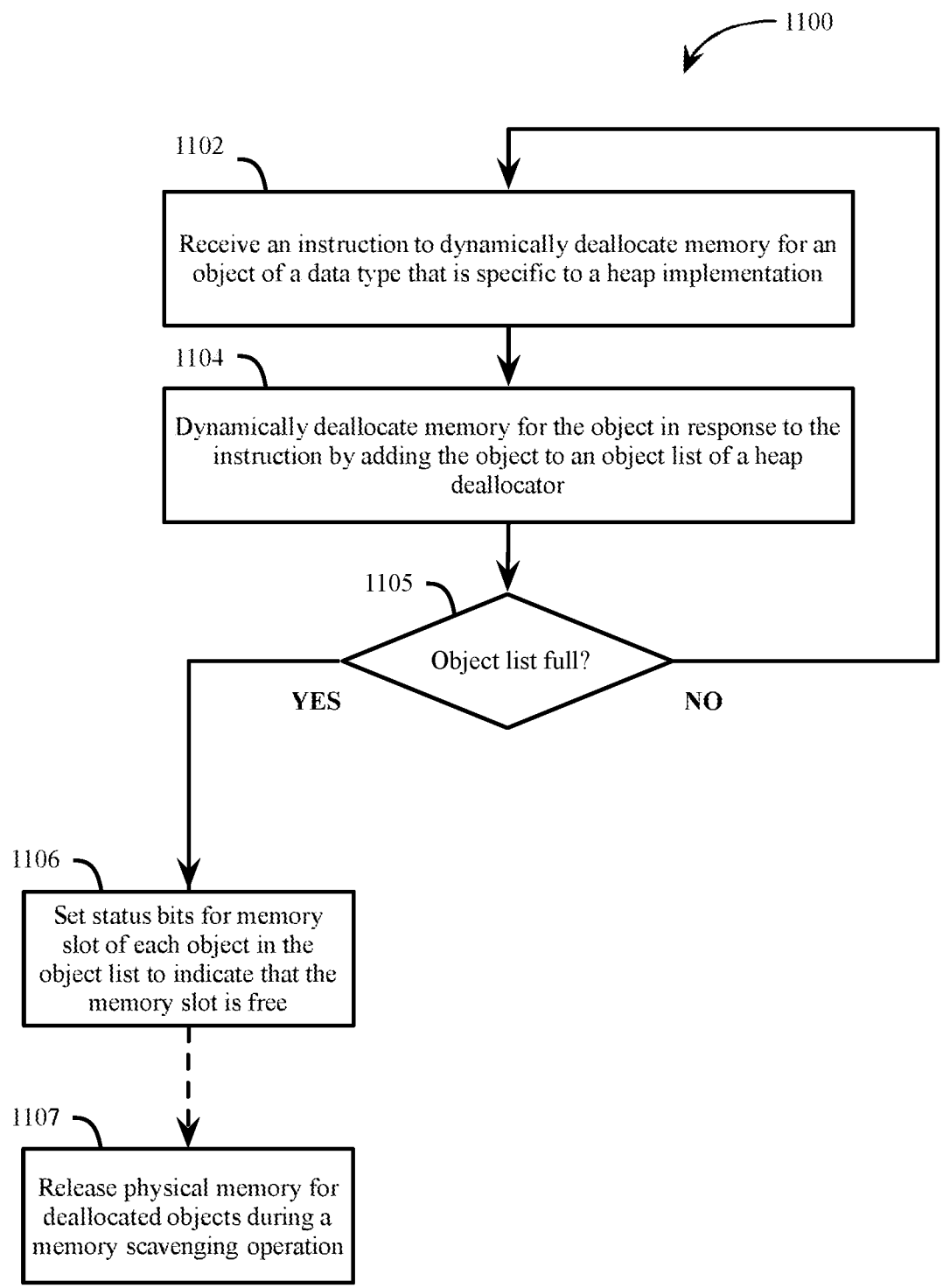
FIG. 11 illustrates a method of deallocating memory within an isolated type-specific heap, according to an embodiment.

FIG. 11 illustrates a method 1100 of deallocating memory within an isolated type-specific heap, according to an embodiment. Method 1100 can be performed by an isolated heap memory deallocator as described herein. Method 1100 includes operation 1102, which receives an instruction to dynamically deallocate memory for an object of a data type that is specific to a heap implementation. To dynamically deallocate the object, method 1100 can perform operation 1104 that includes adding the object to be deallocated to an object list of a heap deallocator. The method 1100 can determine, during operation 1105, whether the object list has become full. If the object list is not full, method 1100 returns to operation 1102 in response to receipt of a subsequent deallocation request. If the object list is determined to be full during operation 1105, method 1100 proceeds to operation 1106, which sets the status bits for the memory slot of each object in the object list to indicate that the memory slot is free. Subsequently, independently of the allocation or deallocation of any specific object, method 1100 can proceed to operation 1107 to release the physical memory for deallocated objects during a memory scavenging operation. In one embodiment, the memory scavenging operation includes scanning status bits associated with a set of memory pages within the heap instance (e.g., within a heap directory) to locate pages that entirely contain deallocated objects, or are otherwise completely empty. The method can select one or more of those pages and release the physical memory for those pages, while retaining the virtual memory associated with the pages.

Figure 12:
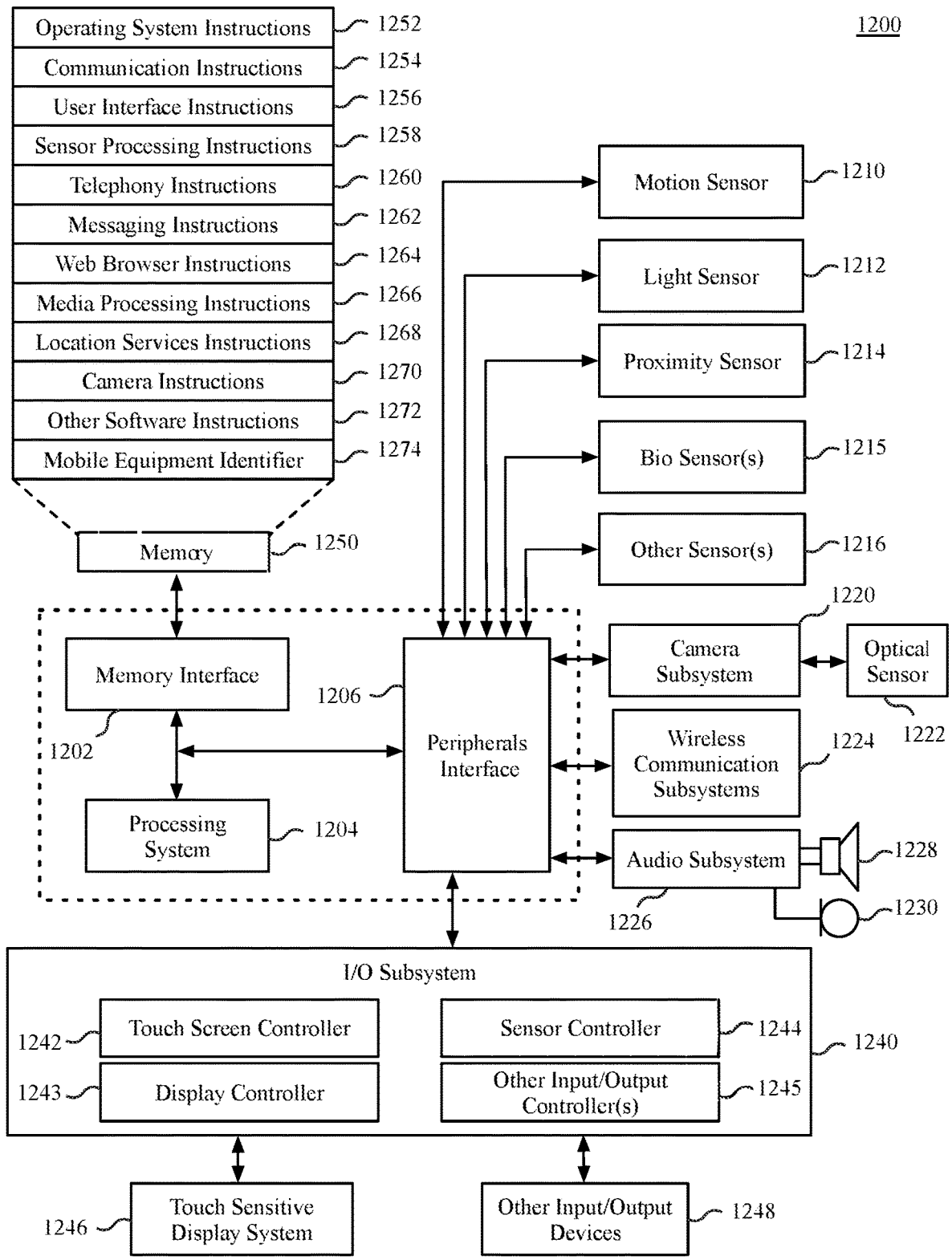
FIG. 12 is a block diagram of a device architecture for an electronic device that can implement isolated type-specific memory heaps as described herein.

FIG. 12 is a block diagram of a device architecture 1200 for an electronic device that can implement isolated type-specific memory heaps as described herein. The device architecture 1200 includes a memory interface 1202, a processing system 1204 including one or more data processors, image processors and/or graphics processing units, and a peripherals interface 1206. The various components can be coupled by one or more communication buses or signal lines. The various components can be separate logical components or devices or can be integrated in one or more integrated circuits, such as in a system on a chip integrated circuit. The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities. A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. The wireless communication subsystems 1224 can provide a communications mechanism over which a media playback application can retrieve resources from a remote media server or scheduled events from a remote calendar or event server.

An audio subsystem 1226 can be coupled to a speaker 1228 and a microphone 1230 to facilitate voice-enabled functions, such as voice recognition, voice replication, digital recording, and telephony functions. In some electronic devices, the audio subsystem 1226 can be a high-quality audio system including support for virtual surround sound.

The I/O subsystem 1240 can include a touch screen controller 1242 and/or other input controller(s) 1245. For computing devices including a display device, the touch screen controller 1242 can be coupled to a touch sensitive display system 1246 (e.g., touch-screen). The touch sensitive display system 1246 and touch screen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1210, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
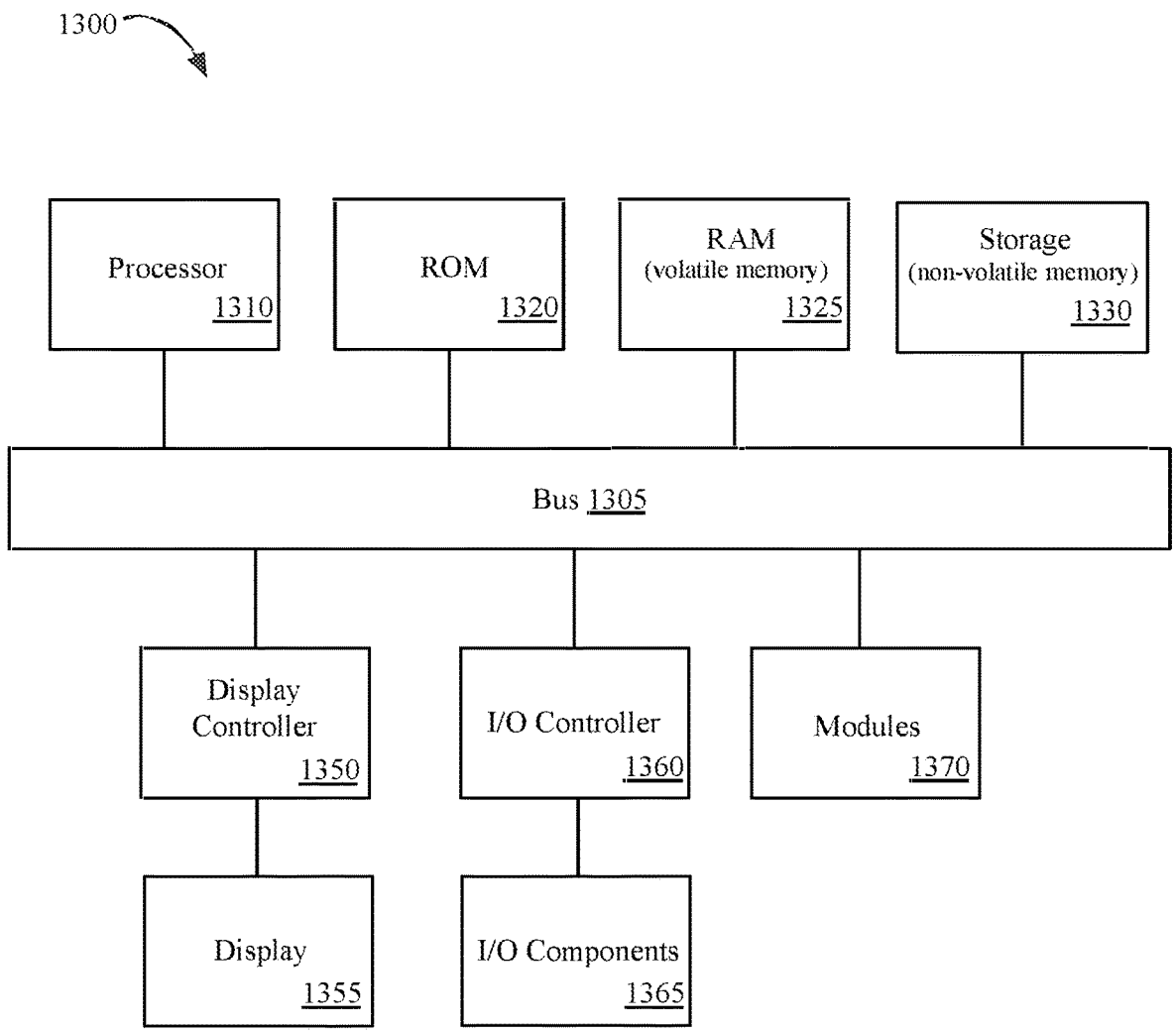
FIG. 13 is a block diagram illustrating a computing system that can be used in conjunction with one or more of the embodiments described herein.

FIG. 13 is a block diagram illustrating a computing system 1300 that can be used in conjunction with one or more of the embodiments described herein. The illustrated computing system 1300 can represent any of the devices or systems described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1300 can include a bus 1305 which can be coupled to a processor 1310, ROM 1320 (Read Only Memory), RAM 1325 (Random Access Memory), and storage 1330 (e.g., non-volatile memory). The processor 1310 can retrieve stored instructions from one or more of the memories (e.g., ROM 1320, RAM 1325, and storage 1330) and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1325 can be implemented as, for example, dynamic RAM (DRAM), or other types of memory that require power continually to refresh or maintain the data in the memory. Storage 1330 can include, for example, magnetic, semiconductor, tape, optical, removable, non-removable, and other types of storage that maintain data even after power is removed from the system. It should be appreciated that storage 1330 can be remote from the system (e.g. accessible via a network).

A display controller 1350 can be coupled to the bus 1305 to receive display data to be displayed on a display device 1355, which can display any one of the user interface features or embodiments described herein and can be a local or a remote display device. The computing system 1300 can also include one or more input/output (I/O) components 1365 including mice, keyboards, touch screen, network interfaces, printers, speakers, and other devices, which can be coupled to the system via an I/O controller 1360.

Modules 1370 (or components, units, functions, or logic) can represent any of the functions or engines described above, such as, for example, the heap implementation 700 of FIG. 7. Modules 1370 can reside, completely or at least partially, within the memories described above, or within a processor during execution thereof by the computing system. In addition, modules 1370 can be implemented as software, firmware, or functional circuitry within the computing system, or as combinations thereof.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide an isolated type-specific memory heap in which objects of a single data type are stored. One embodiment provides for a non-transitory machine-readable medium storing instructions to cause one or more processors to perform operations comprising receiving an instruction to dynamically allocate memory for an object of a data type and dynamically allocating memory for the object from a heap instance that is specific to the data type for the object, the heap instance including a memory allocator for the data type, the memory allocator generated at compile time for the instruction based on a specification of the data type for the heap instance.

One embodiment provides for a non-transitory machine-readable medium storing instructions to cause one or more processors to perform operations comprising receiving an indication of a data type at a compiler, configuring an allocator to service an allocation request by program code compiled by the compiler, receiving a dynamic allocation request from the compiled program code at the compiler, and in response to the allocation request, allocating an object of the indicated data type within a memory heap that is specific to the indicated data type.

One embodiment provides for a data processing system comprising a non-transitory machine-readable medium to store instructions and one or more processors to execute the instructions. When executed, the instructions cause the one or more processors to initialize a memory heap that is specific to a data type, the memory heap including a first directory, the first directory to track a first set of memory pages, associate an allocator and a deallocator with the memory heap, the allocator and deallocator each specific to the data type associated with the memory heap. The one or more processors are further to configure the first directory with a header and a page map, the header including a bitvector to indicate status for memory pages within the first set of memory pages and the page map indicating memory addresses for the first set of memory pages, the memory pages of the first set of memory pages each associated with an index number. The one or more processors can then allocate memory within the memory heap to store an object of the data type.

One embodiment provides for a method comprising receiving an instruction to dynamically deallocate memory for an object of a data type, dynamically deallocating memory for the object in response to the instruction, the memory deallocated from a heap instance that is specific to the data type for the object, the heap instance including a memory allocator and memory deallocator that are specific to data type, and releasing physical memory for multiple deallocated objects while retaining virtual memory addresses associated with the deallocated objects.

Other features of the present embodiments will be apparent from the drawings and from the detailed description above. While the embodiments have been described in connection with examples thereof, the true scope of the embodiments should not be so limited since other modifications will become apparent to the skilled practitioner upon a study of the drawings, specification, and following claims.

What is claimed is:

1. A system comprising:
   a memory; and
   one or more processors configured to:

initialize a memory heap that is specific to a data type, the memory heap including a first directory, the first directory to track a first set of memory pages;

associate an allocator and a deallocator with the memory heap, the allocator and deallocator each specific to the data type associated with the memory heap;

configure the first directory with a header and a page map, the header including a bitvector to indicate status for memory pages within the first set of memory pages and the page map indicating memory addresses for the first set of memory pages, wherein memory pages of the first set of memory pages are associated with an index number; and allocate memory within the memory heap to store an object of the data type.

2. The system of claim 1, wherein the memory heap additionally includes a pointer to a directory having a lowest index number and the one or more processors are further configured to update the pointer in response to an allocation or a deallocation within the memory heap.

3. The system of claim 1, wherein the allocator and the deallocator are stored in thread local storage.

4. The system of claim 1, wherein the one or more processors are further configured to allocate, in response to a determination that all pages associated with the first directory are full, memory for a second directory.

5. The system of claim 1, wherein the one or more processors are further configured to receive a request to deallocate an object stored in a page referenced by the first directory.

6. The system of claim 5, wherein the one or more processors are further configured to locate, in response to receiving the request to deallocate the object, the page storing the object to be deallocated within the page map based on an index associated with the page.

7. The system of claim 5, wherein the one or more processors are further configured to set a bit associated with a location storing the object to indicate that the location is free.

8. The system of claim 5, wherein the one or more processors are further configured to free physical memory associated with the object while retaining a virtual memory address of the object.

9. A method comprising:
initializing a memory heap that is specific to a data type, the memory heap including a first directory, the first directory to track a first set of memory pages;

associating an allocator and a deallocator with the memory heap, the allocator and deallocator each specific to the data type associated with the memory heap;

configuring the first directory with a header and a page map, the header including a bitvector to indicate status for memory pages within the first set of memory pages and the page map indicating memory addresses for the first set of memory pages, wherein memory pages of the first set of memory pages are associated with an index number; and allocating memory within the memory heap to store an object of the data type.

10. The method of claim 9, wherein the memory heap additionally includes a pointer to a directory having a lowest index number and the method further comprises updating the pointer in response to an allocation or a deallocation within the memory heap.

11. The method of claim 9, wherein the allocator and the deallocator are stored in thread local storage.

12. The method of claim 9, further comprising allocating, in response to a determination that all pages associated with the first directory are full, memory for a second directory.

13. The method of claim 9, further comprising receiving a request to deallocate an object stored in a page referenced by the first directory.

14. The method of claim 13, further comprising, in response to receiving the request to deallocate the object, locating the page storing the object to be deallocated within the page map based on an index associated with the page.

15. The method of claim 13, further comprising setting a bit associated with a location storing the object to indicate that the location is free.

16. The method of claim 13, further comprising freeing physical memory associated with the object while retaining a virtual memory address of the object.

17. A non-transitory machine readable medium comprising instructions that, when executed by one or more processors, cause the one or more processors to perform operations comprising:
initializing a memory heap that is specific to a data type, the memory heap including a first directory, the first directory to track a first set of memory pages;

associating an allocator and a deallocator with the memory heap, the allocator and the deallocator each specific to the data type associated with the memory heap;

configuring the first directory with a header and a page map, the header including a bitvector to indicate status for memory pages within the first set of memory pages and the page map indicating memory addresses for the first set of memory pages, wherein memory pages of the first set of memory pages are associated with an index number; and allocating memory within the memory heap to store an object of the data type.

18. The non-transitory machine readable medium of claim 17, wherein the memory heap additionally includes a pointer to a directory having a lowest index number and the operations further comprise updating the pointer in response to an allocation or a deallocation within the memory heap.

19. The non-transitory machine readable medium of claim 17, wherein the allocator and the deallocator are stored in thread local storage.

20. The non-transitory machine readable medium of claim 17, wherein the operations further comprise allocating, in response to a determination that all pages associated with the first directory are full, memory for a second directory.

* * * * *